(12) United States Patent
Correia e Sa Neto et al.

(10) Patent No.: US 10,991,087 B2
(45) Date of Patent: Apr. 27, 2021

(54) FLAME IMAGE ANALYSIS FOR FURNACE COMBUSTION CONTROL

(71) Applicants: Valmiro Correia e Sa Neto, East Amherst, NY (US); Euan J. Evenson, Ontario (CA); Kevin W. Albrecht, Brownsburg, IN (US); James E. Kelly, Grand Island, NY (US); Joaquín de Diego Rincón, Madrid (ES); Jorge Visús Pool, Madrid (ES)

(72) Inventors: Valmiro Correia e Sa Neto, East Amherst, NY (US); Euan J. Evenson, Ontario (CA); Kevin W. Albrecht, Brownsburg, IN (US); James E. Kelly, Grand Island, NY (US); Joaquín de Diego Rincón, Madrid (ES); Jorge Visús Pool, Madrid (ES)

(73) Assignee: Praxair Technology, Inc., Danbury, CT (US)

( * ) Notice: Subject to any disclaimer, the term of this patent is extended or adjusted under 35 U.S.C. 154(b) by 181 days.

(21) Appl. No.: 15/867,166

(22) Filed: Jan. 10, 2018

(65) Prior Publication Data

US 2018/0204317 A1    Jul. 19, 2018

Related U.S. Application Data

(60) Provisional application No. 62/446,563, filed on Jan. 16, 2017.

(51) Int. Cl.
*G06T 7/00* (2017.01)
*F27D 21/02* (2006.01)
*F27D 19/00* (2006.01)

(52) U.S. Cl.
CPC ............ *G06T 7/0004* (2013.01); *F27D 21/02* (2013.01); *F27D 2019/0043* (2013.01); *G06T 2207/30108* (2013.01)

(58) Field of Classification Search
None
See application file for complete search history.

(56) References Cited

U.S. PATENT DOCUMENTS

| | | | |
|---|---|---|---|
| 7,462,218 B2 | 12/2008 | Ducrocq | |
| 7,655,067 B2 | 2/2010 | Lucas et al. | |
| 9,091,484 B2 | 7/2015 | Hegenberg et al. | |
| 2001/0034001 A1* | 10/2001 | Poe | F23C 9/08 431/116 |
| 2007/0171954 A1* | 7/2007 | Lucas | C22B 9/006 373/153 |
| 2007/0264604 A1 | 11/2007 | Nolte et al. | |
| 2009/0190799 A1* | 7/2009 | Matthes | F23G 5/14 382/103 |
| 2009/0218736 A1 | 9/2009 | Lodin et al. | |
| 2013/0307202 A1* | 11/2013 | Hegenberg | F27B 3/28 266/44 |

FOREIGN PATENT DOCUMENTS

CN    102520014 A  *  6/2012

\* cited by examiner

*Primary Examiner* — Matthew D Krcha
(74) *Attorney, Agent, or Firm* — Donald T. Black

(57) ABSTRACT

Operation of a combustion control system of furnace is controlled by image analysis, outside of the furnace or within the furnace, of a flame produced by combustion within the furnace, to correlate the image with carbon monoxide content of the flame, and adjustment of the oxygen and/or fuel flow into the furnace in response to the correlation.

14 Claims, 2 Drawing Sheets

US 10,991,087 B2

FLAME IMAGE ANALYSIS FOR FURNACE COMBUSTION CONTROL

RELATED APPLICATIONS

This application claims the benefit of U.S. Provisional Application Ser. No. 62/446,563, filed on Jan. 16, 2017, which is incorporated herein by reference.

FIELD OF THE INVENTION

The present invention relates to operation of a combustion control system for a furnace (by which is meant an enclosed space such as a combustion chamber in which fuel and gaseous oxidant are combusted) in which material is heated and the heating may cause formation of carbon monoxide, to control and/or lessen the emissions of carbon monoxide from the furnace.

BACKGROUND OF THE INVENTION

Operations in which material is heated in a furnace can lead to formation of carbon monoxide in the furnace. Mechanisms by which carbon monoxide may be formed include incomplete combustion of fuel in the furnace; incomplete combustion of combustible material when the material to be heated in the furnace is also intended to be combusted; and/or conversion of carbonaceous material that is present in or on the material to be heated. Examples of such conversion include pyrolysis and/or incomplete combustion of the carbonaceous material.

When carbon monoxide forms in the furnace, emission of the carbon monoxide out of the furnace is usually undesirable. Various technologies exist for removing carbon monoxide from the gaseous offgas that leaves the furnace, such as absorption of the carbon monoxide onto absorbents, or adding reactants to the offgas which react with the carbon monoxide. Such technologies exhibit drawbacks such as expense and difficulty of implementation and control.

The present invention provides an efficient method for avoiding emission of carbon monoxide from a furnace. It also provides an efficient method for controlling operation of the furnace to obtain improved efficiency and production rates.

BRIEF SUMMARY OF THE INVENTION

One aspect of the present invention is a method of heating material in a furnace, comprising (A) heating material comprising carbonaceous matter in a furnace having a flue, using heat generated by combustion in the furnace of fuel and gaseous oxidant being fed into the furnace, thereby producing carbon monoxide derived from the carbonaceous matter, wherein a flame is formed in the furnace which may extend out of the furnace from the flue;

(B) characterizing the concentration of carbon monoxide in the flame from images of the flame taken inside or outside of the furnace by a digital camera that is located outside the furnace, by expressing electronically at least one parameter that corresponds to the intensity of the flame and that corresponds to the concentration of carbon monoxide in the flame, and determining the characterized concentration of carbon monoxide in the flame from predetermined correlations of the actual concentrations of carbon monoxide in a flame to expressed values of the at least one parameter;

(C) comparing the characterized concentration of carbon monoxide in the flame as characterized in accordance with step (B) to a preestablished threshold concentration value for said concentration;

(D) when the characterized concentration of carbon monoxide in the flame exceeds said preestablished threshold concentration value, adjusting the amount of oxygen, the amount of fuel, or the amounts of both oxygen and fuel, being fed into the furnace that is available to react in the furnace to an amount or amounts thereof that is effective to lower the characterized concentration of carbon monoxide in the flame to be equal or less than the preestablished threshold concentration value for a predetermined length of time, while continuing to characterize the concentration of carbon monoxide in the flame from images of the flame taken by the digital camera outside the furnace.

Another aspect of the present invention is a method of heating material in a furnace, comprising (A) heating material comprising carbonaceous matter in a furnace having a flue, using heat generated by combustion in the furnace of fuel and gaseous oxidant being fed into the furnace, thereby producing carbon monoxide derived from the carbonaceous matter, wherein a flame is formed in the furnace which may extend out of the furnace from the flue;

(B) characterizing the concentration of carbon monoxide in the flame from images of the flame taken inside the furnace or outside the furnace by a digital camera that is located outside the furnace, by expressing electronically at least one parameter that corresponds to the intensity of the flame and that corresponds to the concentration of carbon monoxide in the flame, and determining the characterized concentration of carbon monoxide in the flame from predetermined correlations of the actual concentrations of carbon monoxide in a flame to expressed values of the at least one parameter;

(C) comparing the characterized concentration of carbon monoxide in the flame as characterized in accordance with step (B) to a preestablished threshold concentration value for said concentration;

(D) when the characterized concentration of carbon monoxide in the flame exceeds said preestablished threshold concentration value, adjusting the amount of oxygen being fed into the furnace that is available to react with carbon monoxide in the furnace to an amount that is effective to lower the characterized concentration of carbon monoxide in the flame to be equal or less than the preestablished threshold concentration value for a predetermined length of time, while continuing to characterize the concentration of carbon monoxide in the flame from images of the flame taken by the digital camera outside the furnace.

DETAILED DESCRIPTION OF THE INVENTION

Figure 1:
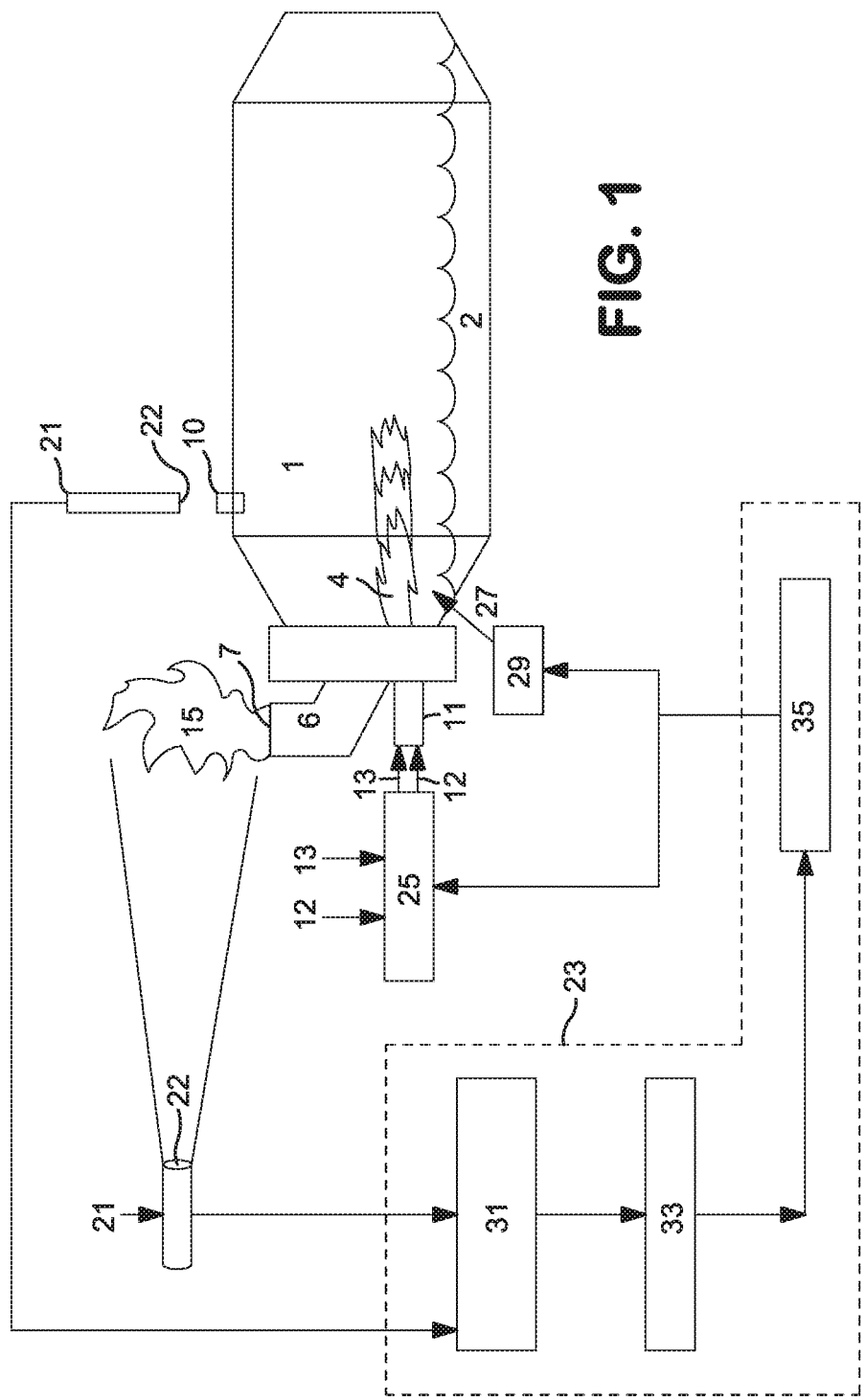
FIG. 1 is a schematic representation showing how the present invention may be implemented on furnace apparatus.

The present invention is useful in heating of any materials that can be heated in a furnace. Examples of such materials include ferrous metals such as iron and steel, including finished products as well as scrap, as well as ferrous ores and other compounds. Additional examples include nonferrous metals, such as aluminum and copper, including finished products as well as scrap, and ores and other compounds thereof. Heating of any such materials is employed to prepare them for further chemical and/or physical processing.

The present invention is also useful in heating of materials in which a portion or all of the material is melted. In such operations, materials may include any of the foregoing metals, metal oxides and other metal compounds. Other examples include products that are melted together in a glassmaking furnace to form molten glass; such materials include recycled glass pieces known as cullet, and raw materials known as batch which are molten together to make glass, such materials including typically sodium oxide, potassium oxide, and silicates of sodium and potassium. Another example of such an operation is a cement kiln, in which raw materials typically including lime or limestone, and silica and/or aluminosilicates (clays) and other desired additives, are heated together so that they melt and react with each other to form the compounds which constitute cement.

The present invention is also useful in heating of materials in which a portion or all of the material is to be combusted, such as incinerators. Materials that may be heated in the practice of this aspect of the present invention include all combustible products such as carbonaceous fuels, and solid waste.

Any of the materials treated in accordance with this invention have the characteristic that they include some carbonaceous matter, such that heating the material may cause carbon monoxide to form in the furnace from the carbonaceous matter. The carbonaceous matter that is present may be organic compounds present in the material being heated, and/or may comprise a portion or all of the material that is being heated and then combusted in the furnace. For example, scrap that comprises aluminum, copper, iron and/or steel may carry thereon carbonaceous matter such as paint or other organic coatings, organic food and/or human waste, and the like. Cullet that is present in glassmaking materials may carry thereon organic matter that is a residue of food products or other organic matter that had been present on the cullet before it is recycled as cullet.

The carbon monoxide that is formed in the furnace may be produced by any one or more of several possible mechanisms, such as incomplete combustion of fuel in the furnace; incomplete combustion of combustible material when the material to be heated in the furnace is also intended to be combusted; and/or conversion of carbonaceous material that is in or on the material to be heated, examples of such conversion including pyrolysis or incomplete combustion of the carbonaceous material. Just as carbon monoxide emissions from furnaces are undesirable regardless of the source of the carbon monoxide, the present invention is useful regardless of the source or mechanism from which the carbon monoxide is formed that is at risk of being emitted from the furnace.

Turning to FIG. 1, furnace 1 is shown in cross-section. While the furnace depicted has the shape that is typical of a furnace that can be rotated about an axis that would be horizontal in the embodiment shown in FIG. 1, the present invention may be practiced with any other type and shape of furnace as well. In furnace 1, material to be heated is represented as 2. Material 2 is heated by heat from a flame 4 that is formed in the furnace by combustion of fuel 13 with oxidant 12 at burner 11. Suitable fuel 13 can be any combustible carbonaceous substance, preferred examples of which include methane, natural gas, and atomized fuel oil. Suitable oxidants fed at 12 include any gaseous product that contains oxygen, such as air, oxygen-enriched air, and streams having oxygen contents at least 50 vol. %, preferably at least 90 vol. %. Streams having such elevated oxygen contents are commercially available from any of several suppliers of atmospheric gases. While one flame 4 is shown, the furnace with which the present invention may be practiced may include more than one burner 11 and more than one flame 4.

Furnace 1 includes at least one flue 6 through which gaseous products can pass out of furnace 1. The gaseous products which pass out of flue 6 include gaseous products of combustion between the oxidant 12 with the fuel 13, such as carbon dioxide and water vapor, and may contain volatile organic compounds (VOC's) and may contain carbon monoxide. In the practical application of this invention, if only one flue 6 is present then a flame 15 may extend from the outlet 7 of flue 6. If two or more flues 6 are present, there may be a flame 15 present extending from at least one outlet 7 of at least one flue 6. Carbon monoxide may be present in flame 15 and may be or may not be completely combusted in flame 15.

Furnace 1 may include a sight port 10 in a wall of the furnace, through which flame 4 inside furnace 1 may be observed from outside furnace 1.

According to the present invention, camera 21 is positioned outside furnace 1. Camera 21 includes aperture 22 through which camera 21 receives an image. In one embodiment of the invention, camera 21 is positioned in relation to furnace 1 so that the aperture 22 of camera 21 is pointed toward flame 15. In another embodiment of the invention, camera 21 is positioned in relation to furnace 1 so that aperture 22 of camera 21 is aligned with sight port 10, so that camera 21 can receive an image of flame 4 inside the furnace 1.

Camera 21 is a digital camera, meaning that camera 21 detects one or more characteristics of the object (in this case, the detected characteristics including at least an intensity of the flame toward which the camera 21 is pointed) and expresses electronically in digital form an image that corresponds to the detected characteristics. Digital cameras with this capability are commercially available. They can be a standalone unit or can be part of an item of equipment that has additional functional capabilities as well (such as telephony, timekeeping, and the like).

Still referring to FIG. 1, controls 25 control the rate of flow of oxidant 12 and fuel 13 to burner 11 (or to multiple burners if more than one burner 11 is present). Optionally but preferably, lance 27 is provided to emit supplemental oxidant into furnace 1 when additional oxidant is to be passed into furnace 1. The flow of oxidant through lance 27 is controlled by controls 29. The oxidant that may be passed through lance 27 into furnace 1 can be air, oxygen-enriched air, or higher purity oxidant having an oxygen content of at least 50 vol. % and even at least 90 vol. %. The oxygen content of oxidant that is fed through lance 27 into furnace 1 can be the same or different relative to the oxygen content of the oxidant 12 that is fed into furnace 1.

Figure 2:
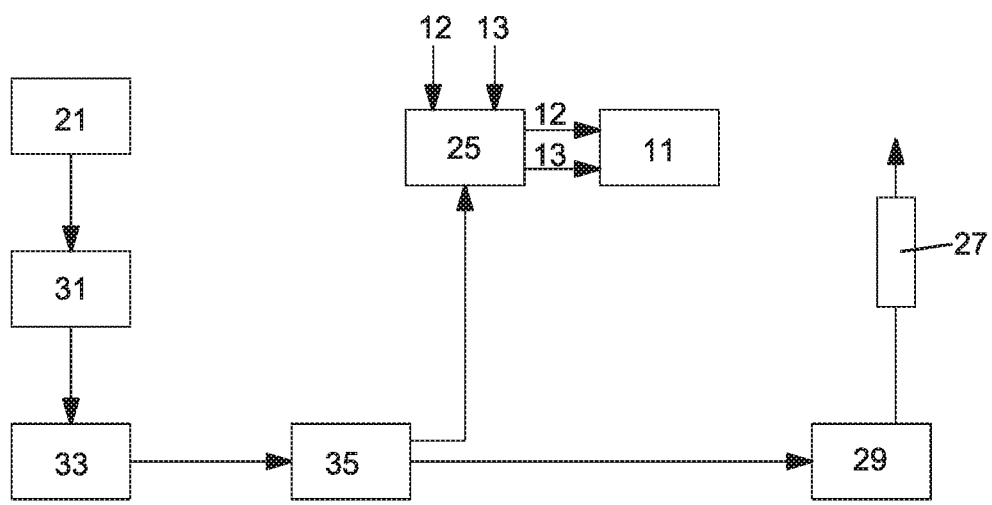
FIG. 2 is a chart showing the sequence of steps of the present invention.

In FIG. 1, block 23 refers to the complete system that carries out the sequence of steps that are set forth in FIG. 2 as 31, 33 and 35. The system can be present in one integrated apparatus, or components that carry out particular steps can be physically separated from other components and connected to each other by suitable cables or by cableless wireless connection. Some or all of the components can be included in the camera 21. However, for ease of function and because of the possibility that camera 21 may be located in an environment that may be hot and dusty and thus potentially harsh to the components such as processors, it is preferred for camera 21 to be physically separated from the other components, and for camera 21 to be connected by cable or wireless connection to at least the component that carries out the step 31 that first follows the acquisition of images by camera 21. As can be seen in FIG. 1, system 23 is connected to camera 21 to receive input from camera 21, and system 23 is connected to controls 25 and (if present) to controls 29, to provide signals to controls 25 and 29.

In operation, combustion is carried out inside furnace 1 in the presence of material 2 in furnace 1. A flame is formed in the furnace which may appear as flame 15 extending out from opening 7 of a flue 6. In one embodiment of the invention, camera 21 is pointed at flame 15 so that images of flame 15 are received through aperture 22. In another embodiment of the invention, camera 21 is pointed toward furnace 1 so that an image of a flame 4 inside furnace 1 is received at aperture 22 through sight port 10. The flame 15 or 4 can be very bright, so the aperture 22 and exposure should be adjusted to prevent blooming of the image. In some circumstances it might be desirable to be able to adjust the exposure of the image dynamically so that adequate resolution is achieved when the image is very dark. In most circumstances such dynamic adjustment is not necessary. The view factor and resolution of the camera image should be such that the image size is at least 50 by 50 pixels, preferably at least 300 by 300 pixels. A person skilled in the art can easily determine the appropriate image resolution and image view factor for a given distance of the camera 21 from flame 15 or 4, and for a given size of flame 15 or 4. The camera 21 creates a digital electronic image of flame 15 or flame 4, based on at least one parameter of the flame, such as an intensity of the flame 15 or flame 4. The electronic image is transmitted electronically by the camera 21 to apparatus that carries out step 31.

In step 31 the signal corresponding to the image of the flame 15 or 4 is converted to one or more values that represent the intensity or variety of intensities of the flame, and may comprise a range of values over the area of the flame that is within the field of view of the camera 21. The intensities are detected and expressed digitally to create an array of values that correspond to the detected intensity. The detected intensity parameter corresponds also to a concentration of carbon monoxide that is present in the flame.

In step 33, the detected intensity parameter is compared to preestablished correlations of the intensity parameter to actual concentrations of carbon monoxide in the flame. The preestablished correlations can be established by simultaneously measuring the concentration of carbon monoxide in the flame via an established technique such as gas sampling using a gas sampling probe followed by analysis of the sampled gas, or continuous emission monitoring, and observing the value of the expressed parameter that is derived in step 31 from the value based on intensity as detected by the camera 21, and recording the measured concentration and the parameter value together where they can be read together, such as in a computer or in a written catalog. In this way, each intensity parameter that is expressed by the system corresponds to an actual concentration value of carbon monoxide in the flame. The determination of the preexisting correlations between the expressed parameter and the measured carbon monoxide concentration, can have already been carried out, during the initial setup of the system at a furnace, and usually does not need to be repeated at a given furnace every time that the furnace is being operated. However, the operator may find it preferable to establish a fresh set of correlations for different furnaces, as well as at a given furnace in situations in which the conditions under which the given furnace is to be operated will differ significantly.

The system described herein can be used to achieve any of several methods of controlling furnace operation. One such method is to control carbon monoxide emissions by control of oxygen feed to the furnace, which is now described:

The operation of the furnace will have a preestablished value for the concentration of carbon monoxide in the flame, such that carbon monoxide concentration values above that value are not acceptable and must be lowered. Typical values of excess carbon monoxide can be in the range of 3 vol. % to 30 vol. %, although values may vary depending on the location, the nature of the material 2 being heated in furnace 1, or other conditions. The preestablished value is based on any factor or group of factors that have significance to the operator, such as values that represent excessive risk of environmental harm, or that risk violation of applicable environmental regulations, or that indicate an undesired imbalance of economic and thermodynamic conditions in the furnace.

In step 33 the preestablished value for the concentration of carbon monoxide in the flame (which may also be termed a threshold value, or a set point) is stored, and the detected intensity parameter that corresponds to the carbon monoxide concentration in the flame at a point in time is compared to the preestablished threshold value. The comparison can be performed at any desired rate, but preferably the comparison is performed at a rate of once every 2 to 5 seconds. Preferably the comparison is performed automatically by a suitably programmed controller.

When the detected and processed intensity parameter corresponds to an actual carbon monoxide concentration in the flame that exceeds the preestablished threshold value, then the system performs an action that results in additional oxygen being provided within furnace 1. In FIG. 2, this action is represented as generating in step 33 a signal which activates combustion control system 35 to cause additional oxygen to be present within furnace 1. The additional oxygen is to react with carbon monoxide present in the furnace, so that less carbon monoxide leaves the furnace 1 via flue 6 in flame 15 or otherwise. Additional oxygen may be provided into furnace 1, to react with the detected excess of carbon monoxide, by any of several modes. For instance, one such mode is for control system 35 to increase the amount of oxygen 12 being fed into furnace 1 through burner 11 without increasing the flow rate of fuel 13 into furnace 1. Another possible mode is to feed supplemental oxidant, or an increased amount of supplemental oxygen, through supplemental feed line 29 (shown in FIG. 1), also without increasing the flow rate of fuel 13 into furnace 1. Yet another possible mode is decreasing the amount of fuel 13 fed into furnace 1, without decreasing the amount of oxygen 12 or supplemental oxygen 27 that is fed into furnace 1. Or, any combination of these modes can be implemented at the same time.

The preferred embodiment is to provide supplemental oxygen 27, so that the operator does not have to adjust the stoichiometric ratio of the oxidant and fuel being fed through the one or more burners 11. Supplemental feed line 27 should preferably be positioned so that it feeds oxidant into regions within the furnace in which relatively higher amounts of carbon monoxide may be present, or into regions where carbon monoxide would particularly be undesirable, such as near the area where the interior of furnace 1 connects with the upstream end of flue 6.

The provision of additional oxygen is continued until the detected and processed value representing the carbon monoxide concentration in the flame decreases to a value equal to or less than the aforementioned preestablished threshold value. If preferred, the additional oxygen should be provided until the detected and processed value is less than the preestablished threshold value, such as 0.5% to 2% below the preestablished threshold value, to minimize the number of times that the provision of the additional oxygen has to be initiated and then discontinued.

The steps 31, 33 and 35 can be carried out in suitably programmed controllers that are connected to each other by suitable cables or by wireless connections. Instead, they may all be present in one piece of hardware.

As indicated, the system described herein can also be used to carry out other methods of controlling the operation of the furnace, by adjusting the feed of oxygen (oxidant), fuel, or both oxygen and fuel, to achieve desired combustion characteristics within the furnace or to carry out control of furnace operation from startup. In this embodiment of the invention, one set point or more than one set point (typically 3 to 10 set points) are preestablished in the controller that correspond to fuel flow rates and oxygen flow rates to the furnace (in one burner or in each of several burners if the furnace has multiple burners).

In these embodiments, the image analysis parameters are received in step 33 and compared with the control levels set-points defined by the user who also pre-set the flow rate values to be used in the burner and oxidant lance for each level. This last part is communicated with the furnace combustion control PLC. The user can also select other process parameters such as timers to activate/deactivate the control levels. The user may at this stage also select the language that will appear on control panels that the operator will see, and may also select other variables to be controlled. The controller 33 collects data from the camera and related software, processes this data along with user inputs (limits, oxygen flow set point, natural gas flow set point, delay times) and dynamically adjusts the process to reduce CO emissions and increase production of the furnace.

The user selects the control variable and sets up the start limits, the stop limits, and "off-delay" values (in any number of each that is desired, typically 1 to 10 of each, and a number (typically 1 to 5) of "on-delay" values. The user also sets an oxygen flow set point and burner natural gas flow set point for each corresponding limit. When the first start limit has been exceeded for more than the on delay time, the software sets the corresponding oxygen flow set point and natural gas flow set point. The set points are processed in order as the limits are exceeded. Once the control variable falls below the stop limit and the off delay timer is complete, the preceding level is set.

When the control variable falls below all stop limits and the final off delay is finished, the oxygen set point is set to zero and the burner fuel set point is returned to normal control.

If the furnace door is opened, the oxygen set point is set to zero and the burner fuel set point is returned to normal control.

The system and method described herein enable the operator to realize benefits in the operation of the furnace, such as more efficient operation in terms such as fuel consumption and reduced cycle time. By monitoring the carbon monoxide content of the flame (and doing so in real time, which is how the present invention can be utilized), the operator can adjust the oxygen and/or fuel feed rates to the furnace so that the heat of combustion of carbon monoxide can be retained in the furnace and utilized to advantage, thereby enabling the operator to achieve the same degree of heating and/or melting of material within the furnace in a shorter cycle time, and enabling the operator to achieve the heating and/or melting with less fuel consumption per unit of material heated.

The present invention is an advantageous method for controlling carbon monoxide emissions from furnaces, and for controlling overall furnace operation, for several reasons. One reason is that implementation of the method of the present invention to an operating furnace does not require ongoing direct measurement of the concentration of the carbon monoxide in the flame. Another reason is that the present invention measures detects parameters that characterize carbon monoxide in the flame, rather than in flue gases or exhaust gases where the measurement is prone to be more variable and less reliable. Also, the method of the present invention does not measure temperatures of the flame, and is not based on measuring differences of flame temperature, and thus is more reliable and less vulnerable to temperature fluctuations in the flame. Instead, the method of the present invention is based on correlations of image parameters that correspond to the carbon monoxide concentration in the flame, which is believed to be a novel and efficient mode of operation.

Other advantages would include reduced requirement for maintenance of the equipment that is used; lower installation cost and little or no downtime of the furnace for installation of the system that performs the invention; and faster response time to adjust the oxygen feed, the fuel feed, or both the oxygen feed and the fuel feed, when the system detects a condition that requires an increase or other change in the amount of oxygen and/or the amount of fuel being fed into the furnace.

What is claimed is:

1. A method of heating material in a furnace, comprising
(A) heating material comprising carbonaceous matter in a furnace having a flue, using heat generated by combustion in the furnace of fuel and gaseous oxidant being fed into the furnace, thereby producing carbon monoxide derived from the carbonaceous matter, wherein a flame is formed in the furnace which may extend out of the furnace from the flue;
(B) taking images detecting an intensity of the flame inside the furnace or outside the furnace by a digital camera that is located outside the furnace, expressing electronically in digital form an image that corresponds to the detected intensity, and characterizing the concentration of carbon monoxide in the flame from said image images of the detected intensity of the flame detected taken inside the furnace or outside the furnace by said digital camera that is located outside the furnace, by expressing electronically at least one parameter that corresponds to the detected intensity of the flame and that corresponds to the concentration of carbon monoxide in the flame, and determining the characterized concentration of carbon monoxide in the flame from predetermined correlations of the actual concentrations of carbon monoxide in a flame to expressed values of the at least one parameter;
(C) comparing the characterized concentration of carbon monoxide in the flame as characterized in accordance with step (B) to a preestablished threshold concentration value for the concentration of carbon monoxide in the flame;

(D) when the characterized concentration of carbon monoxide in the flame exceeds said preestablished threshold concentration value, adjusting the amount of oxygen, the amount of fuel, or the amounts of both oxygen and fuel, being fed into the furnace that is available to react in the furnace to an amount or amounts thereof that is effective to lower the characterized concentration of carbon monoxide in the flame to be equal or less than the preestablished threshold concentration value for a predetermined length of time, while continuing to characterize the concentration of carbon monoxide in the flame from images of the flame taken by the digital camera outside the furnace, wherein said method does not measure temperatures of the flame and is not based on measuring differences of flame temperature.

2. A method according to claim 1 wherein said material comprises metal.

3. A method according to claim 1 wherein in step (A) at least a portion of said material that is heated is combusted.

4. A method according to claim 1 wherein in step (A) at least a portion of said material that is heated is melted.

5. A method according to claim 1 wherein in step (D), adjusting the amount of oxygen in the furnace that is available to react in the furnace comprises increasing the amount of oxygen that is fed into said furnace relative to the amount of said fuel that is fed into said furnace.

6. A method according to claim 1 wherein in step (D), adjusting the amount of oxygen in the furnace that is available to react in the furnace comprises decreasing the amount of said fuel that is fed into said furnace relative to the amount of oxygen that is fed into said furnace.

7. A method according to claim 1 wherein the flame extends out of the furnace from the flue, and images are taken by the digital camera of the flame extending out of the furnace from the flue.

8. A method according to claim 1 where images are taken by the digital camera of the flame inside the furnace.

9. A method according to claim 1 comprising adjusting the amount of oxygen being fed into the furnace when the characterized concentration of carbon monoxide in the flame exceeds said preestablished concentration value.

10. A method according to claim 1 comprising adjusting the amount of fuel being fed into the furnace when the characterized concentration of carbon monoxide in the flame exceeds said preestablished concentration value.

11. A method according to claim 1 comprising adjusting the amount of oxygen and the amount of fuel being fed into the furnace when the characterized concentration of carbon monoxide in the flame exceeds said preestablished concentration value.

12. A method of heating material in a furnace, comprising
(A) heating material comprising carbonaceous matter in a furnace having a flue, using heat generated by combustion in the furnace of fuel and gaseous oxidant being fed into the furnace, thereby producing carbon monoxide derived from the carbonaceous matter, wherein a flame is formed in the furnace which may extend out of the furnace from the flue;

(B) taking images detecting an intensity of the flame inside the furnace or outside the furnace by a digital camera that is located outside the furnace, expressing electronically in digital form an image that corresponds to the detected intensity, and characterizing the concentration of carbon monoxide in the flame from said image images of the detected intensity of the flame detected taken inside the furnace or outside the furnace by said digital camera that is located outside the furnace, by expressing electronically at least one parameter that corresponds to the detected intensity of the flame and that corresponds to the concentration of carbon monoxide in the flame, and determining the characterized concentration of carbon monoxide in the flame from predetermined correlations of the actual concentrations of carbon monoxide in a flame to expressed values of the at least one parameter;

(C) comparing the characterized concentration of carbon monoxide in the flame as characterized in accordance with step (B) to a preestablished threshold concentration value for the concentration of carbon monoxide in the flame;

(D) when the characterized concentration of carbon monoxide in the flame exceeds said preestablished threshold concentration value, adjusting the amount of oxygen being fed into the furnace that is available to react with carbon monoxide in the furnace to an amount that is effective to lower the characterized concentration of carbon monoxide in the flame to be equal or less than the preestablished threshold concentration value for a predetermined length of time, while continuing to characterize the concentration of carbon monoxide in the flame from images of the flame taken by the digital camera outside the furnace, wherein said method does not measure temperatures of the flame and is not based on measuring differences of flame temperature.

13. A method according to claim 12 wherein in step (D), adjusting the amount of oxygen in the furnace that is available to react with carbon monoxide in the furnace comprises increasing the amount of oxygen that is fed into said furnace relative to the amount of said fuel that is fed into said furnace.

14. A method according to claim 12 wherein in step (D), adjusting the amount of oxygen in the furnace that is available to react with carbon monoxide in the furnace comprises decreasing the amount of said fuel that is fed into said furnace relative to the amount of oxygen that is fed into said furnace.

* * * * *